UNITED STATES PATENT OFFICE.

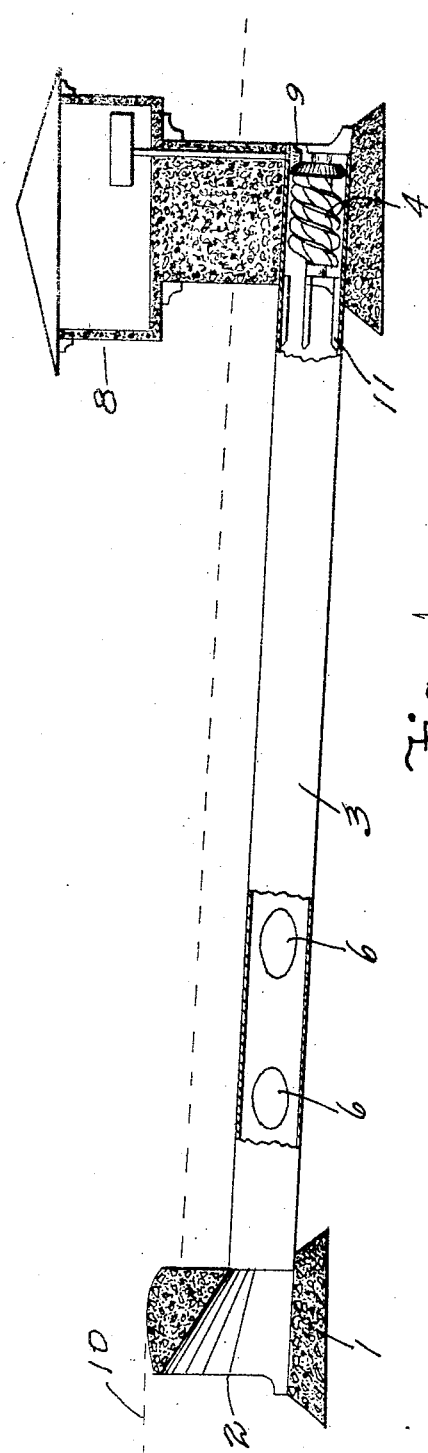
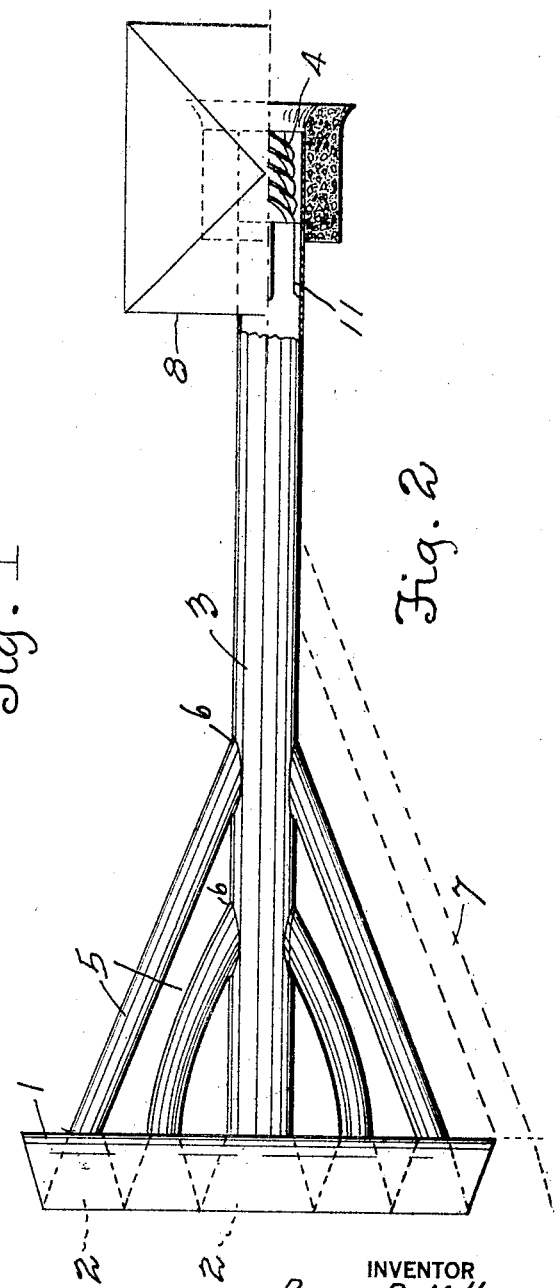

RUFUS B. MILLER, OF WALLA WALLA, WASHINGTON.

UNDERCURRENT-POWER ACCUMULATOR.

1,368,042.　　　　Specification of Letters Patent.　　Patented Feb. 8, 1921.

Application filed November 15, 1919. Serial No. 338,293.

*To all whom it may concern:*

Be it known that I, RUFUS B. MILLER, a citizen of the United States, residing at Walla Walla, in the county of Walla Walla and State of Washington, have invented certain new and useful Improvements in Undercurrent-Power Accumulators, of which the following is a specification.

This invention relates to a means and a method of accumulating power from running streams and has for its object to provide a means that will gather and, in a measure impound the water of running streams; a further object is to conduct the gathered water from various points of the stream and along the bed of a stream to a motor.

With this and other objects in view reference is had to the accompanying drawing in which—

Figure 1 is a side elevation of the device with part in section, and

Fig. 2 is a plan view thereof with part in section.

In the drawings like numerals refer to like parts throughout and the numeral 1 refers to a dam consisting of a furcated structure having relatively cone shaped apertures 2 forming the furcations and positioned to be joined by a main conduit 3 disposed centrally of the dam.

This main conduit extends from the dam downstream and at its downstream or lower end contains a motor 4 of any approved design. A housing may be provided as shown if desired and steps may lead down from the housing to the motor.

Branch conduits 5 connect other apertures angularly with the main conduit, as shown at the numeral 6, to prevent as much frictional loss of power as possible.

The branch conduits may be increased in number from time to time as shown by the dotted lines 7 and thus the main conduit may be maintained full to its capacity at all times.

The housing 8 may contain electrical machinery wherewith to convert the water power into electrical energy which may be carried to the shore by wires, or cables or other means applicable therefor, and the power may be transmitted into the housing by the mechanism 9 or other means.

The main conduit may consist of a straight or tapered pipe and the branch conduits may also be so designed to give the best results.

The conduits are submerged and rest securely on the bed of the stream, the dam only extending to the water level which is represented by the dotted line 10.

Fins 11 direct the water against the motor and prevents its whirling.

It is now plainly seen that the dam will gather and direct volumes of water into the main and branch conduits and that the conduits resting on the bed of the stream are not liable to damage from debris, and the action of the water on the motor will rotate it with great power.

It is understood that details of construction and other minor changes may be made without departing from the spirit of my invention as defined by the appended claims.

Having thus described my invention I claim—

1. In an undercurrent power accumulator, a furcated accumulating dam, a motor, a main conduit connecting said dam, at one of its furcations, with said motor, branch conduits connecting others of its furcations angularly with said main conduit, and the whole submerged on the bed of a stream.

2. In an undercurrent power accumulator, a dam, said dam containing a plurality of apertures, a motor, a main conduit connecting one of said apertures with the said motor, a plurality of branch conduits connecting the others of said apertures angularly with said main conduit, and the whole submerged on the bed of a stream.

3. In an undercurrent power accumulator, a dam, said dam containing a plurality of apertures, said apertures being relatively cone shaped, a motor, a main conduit connecting one of said apertures with said motor, a plurality of branch conduits connecting the others of said apertures angularly with said main conduit and the whole submerged on the bed of a stream.

4. In an undercurrent power accumulator, a dam, said dam containing a plurality of apertures, said apertures being relatively cone shaped and extending through said dam, a motor, a main conduit connecting said dam and said motor, branch conduits connecting said dam and said main conduit, and the whole submerged on the bed of a stream.

5. In an undercurrent power accumulator, a forked conduit, the forked end thereof positioned upstream, and the combined end thereof positioned downstream, a motor suitably attached to said downstream end of said conduit, and the whole submerged on the bed of a stream.

In testimony whereof I affix my signature.

RUFUS B. MILLER.